Jan. 5, 1954

R. R. FEESER 2,664,580

CORN SILKING AND CLEANING MACHINE

Filed Aug. 23, 1949

INVENTOR.
ROY R. FEESER
BY
Clarence B. DesJardins
HIS ATTORNEY

Jan. 5, 1954 R. R. FEESER 2,664,580
CORN SILKING AND CLEANING MACHINE
Filed Aug. 23, 1949 3 Sheets-Sheet 3

INVENTOR.
ROY R. FEESER
BY
Clarence B. DesJardins
HIS ATTORNEY

Patented Jan. 5, 1954

2,664,580

UNITED STATES PATENT OFFICE 2,664,580

CORN SILKING AND CLEANING MACHINE

Roy R. Feeser, Thomasville, Pa.

Application August 23, 1949, Serial No. 111,949

16 Claims. (Cl. 15—3.2)

This invention relates to machines for cleaning and silking ears of corn and, more particularly, to machines adapted for use in food processing plants for accomplishing the thorough scrubbing and cleaning of each ear of corn as it is passed therethrough so as to prepare the corn for its final treatment in the food preparation process.

In the processing of sweet corn in canning factories, and particularly in the case where the corn is to be quick frozen in its whole condition, i. e., with the kernels still attached to the cob, it is extremely important to see that all foreign matter and all of the silk is removed from the ear before it is blanched and frozen. In other words, it is imperative that the corn be in a spotlessly clean condition before it is given its final blanching and freezing treatment. To perform this cleaning operation by hand is not only a tedious and painstaking task but also a costly one because of the great amount of labor involved. In order to reduce the time and labor consumed in this part of the processing operation, I have produced a machine which will thoroughly clean and scrub each ear of corn that is passed through the machine so as to provide ears of corn from which substantially all foreign matter and silk has been removed.

I accomplish this result by revolving each ear of corn while passing it beneath a series of rotating brushes, the corn being subjected to a water spray during the brushing operation so as to carry away the foreign matter and silk removed therefrom by the brushes. The water spray also wets the silk and aids in its removal from the ear in a manner to be more fully explained hereinafter.

Accordingly, it is an object of my invention to provide a corn cleaning and silking machine which is small and compact and which is constructed as a self-contained unit which may readily be stored away when not in use.

Another object of my invention is to provide a corn cleaning and silking machine which is so designed as to facilitate the cleaning of the machine at the end of the day and also to facilitate the speedy elimination of any jams which might occur in the machine during the feeding of the ears therethrough.

A further object of my invention is to provide a corn cleaning and silking machine in which the ears of corn are gravity fed through the machine in a tandem fashion along a trough formed by a pair of inclined, revolving, supporting rolls above which are located a series of bristle brushes revolving about an axis parallel to that of the rolls.

A further object of my invention is to provide a corn cleaning and silking machine of the character set forth in the preceding object wherein the brushes may be moved away from the corn traveling along the rolls without stopping the machine, thereby facilitating the elimination of any jams which might occur during the feeding of the ears along the rolls. This feature has the further advantage of enabling the operator to quickly and thoroughly clean out his machine at the end of the run.

A further object of my invention is to provide a machine of the character set forth in the preceding object in which means is provided for adjusting the position of the brushes with respect to the supporting rolls so as to adapt the machine to various sizes of ears of corn.

A further object of my invention is to provide a corn cleaning and silking machine in which the ears of corn are fed along a trough formed by a pair of inclined, corrugated rolls which are rotated in synchronism and are eccentrically mounted on their driving shaft in such a manner as to produce the effect of lateral reciprocation of the trough as the rolls are revolved whereby the corn is agitated and caused to feed along the rolls under the influence of gravity.

A further object of my invention is to provide a corn cleaning and silking machine in which the ears of corn are fed along a trough formed by a pair of oppositely rotating, corrugated rolls above which is located a brush device revolving about an axis parallel to the axis of the rolls for cleaning and rotating each ear of corn as it passes along the rolls, and a guard rail being provided above and parallel to one of the rolls for preventing the corn from being forced sidewardly out of the trough by the rotating brush device.

A further object of my invention is to provide a corn cleaning and silking machine of the type described in the foregoing objects in which means is provided for wetting the corn as it is being fed through a guide chute into the machine and also as it is being scrubbed by the brushes while moving down the trough formed by the rolls.

With these and other objects in view which will more clearly appear as the description proceeds, I shall now describe my invention in connection with the accompanying drawings in which.

The machine which I have designed for accomplishing the foregoing objects is comprised of six principal parts, namely, a frame, a feed-in chute, a corn supporting and feeding trough, a rotary brush mechanism, a water spraying apparatus, and a drive mechanism. These parts are so constructed and arranged as to form a novel and practicable type of machine for cleaning and silking ears of sweet corn so as to prepare them for further treatment in food processing plants.

Figure 2:
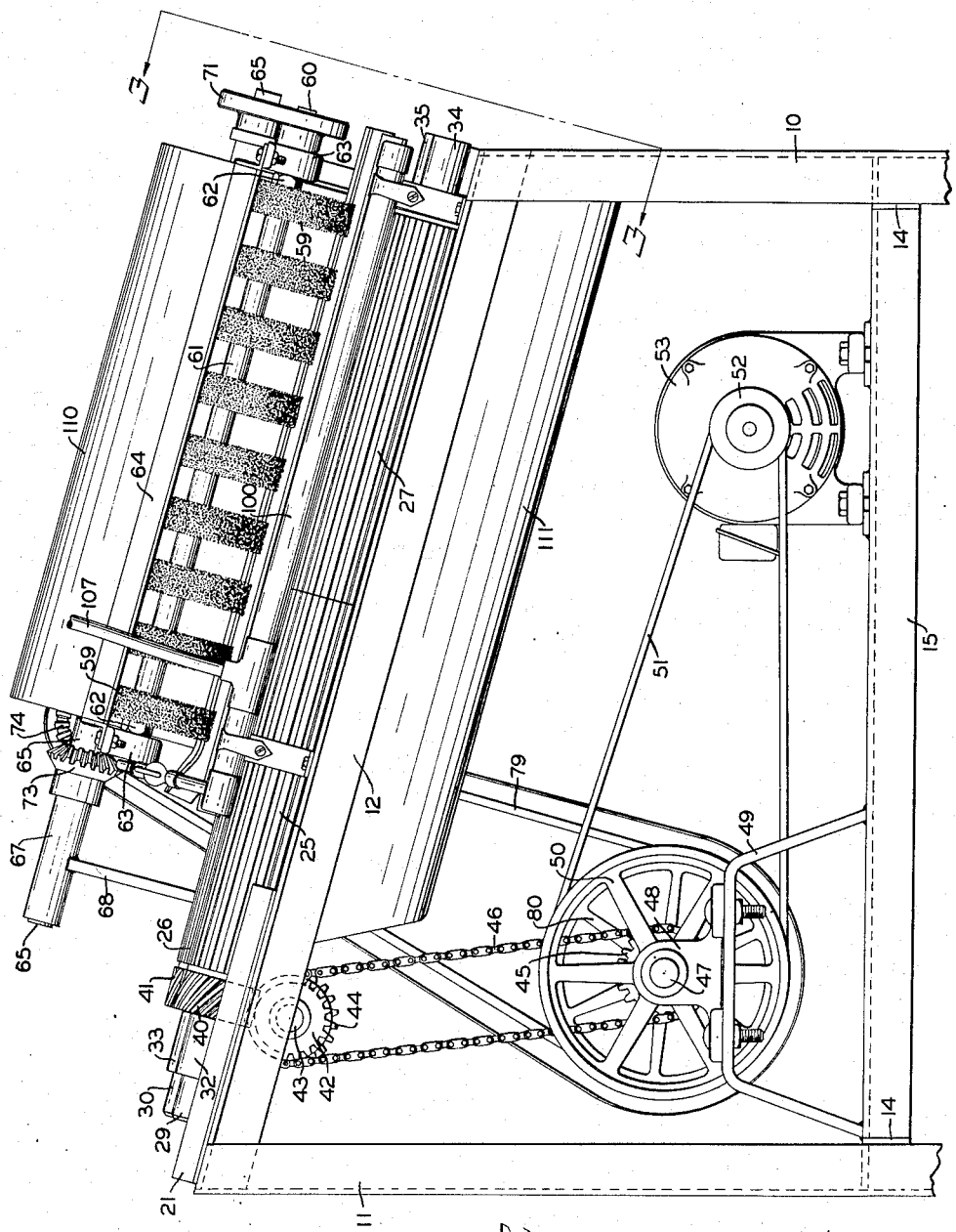
Figure 2 is a side elevation of my machine showing the driving mechanism for the rolls and for the brushes.

As shown in the drawings the frame is comprised of four upright legs, two of which are indicated by the reference numeral 10 and two by the reference numeral 11. As best shown in Figure 2, the pair of legs 11 are somewhat longer than the legs 10 so as to cause the top surface of the machine on which the feeding and brushing mechanism is mounted to be inclined at approximately 15° with respect to the horizontal as is clearly shown in this figure of the drawings. As shown herein, the legs 10 and 11 and also many other parts of the frame are constructed of angle iron in order to impart a high degree of rigidity to the frame without at the same time causing the machine to be excessively heavy and unwieldy.

Figure 1:
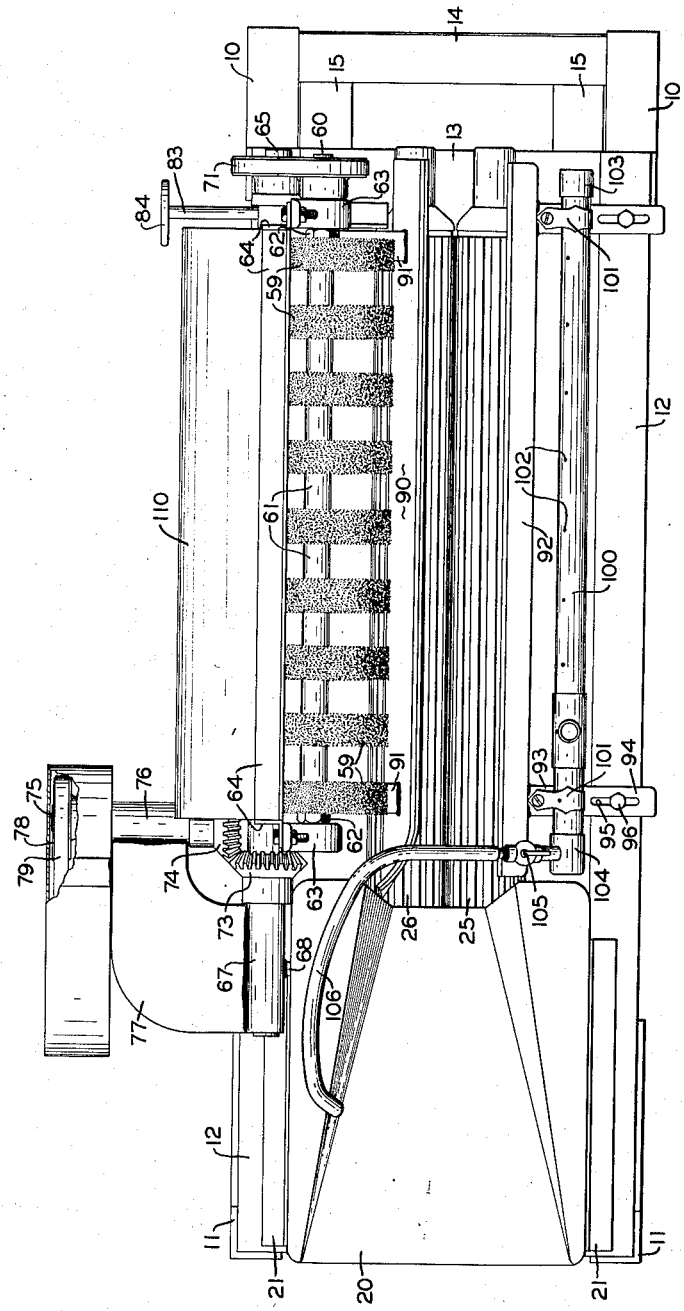
Figure 1 is a modified plan view of my machine with the brush mechanism in its raised position so as to expose the rolls on which the corn is supported as it travels through the machine.

As shown in Figures 1 and 2 the upper ends of the legs 10 and 11 are connected by a pair of inclined side rails 12 while each pair of legs 10 and 11 are connected with one another at their upper ends by a pair of end rails 13 (only one shown) so as to provide a table-type of frame having an inclined top surface. The frame is further reinforced by a pair of cross rails 14 (Figs. 1 and 2) attached to and extending between each pair of legs 10 and 11 and the latter rails are in turn connected with one another by a pair of spreader bars 15 extending between and secured to the rails 14.

The corn is fed into the machine through a guide chute 20 (Fig. 1) which is removably supported on the elevated end of the side rails 12 where it is held in position by strips of angle iron 21 located on either side of the chute and secured to the rails 12.

Figure 3:
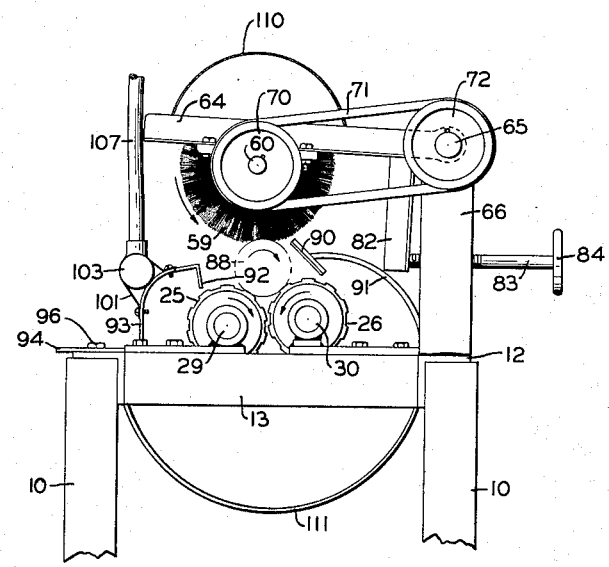
Figure 3 is an end view of the machine as it appears when viewed from along the line 3—3 in Figure 2.
Figure 4:
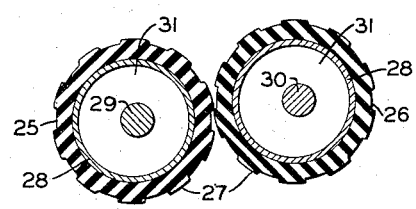
Figure 4 is a cross-sectional view taken through the rolls on which the corn is supported as it passes through the machine.

The narrow, or delivery end of the chute 20 is located immediately above the upper ends of a pair of corn supporting rolls 25 and 26 which lie parallel to one another and, in effect, provide a trough (see Figure 3) along which the ears of corn may travel as they proceed through the machine. The rolls are preferably made of rubber or other similiar resilient material and are formed on their outer peripheries with a series of longitudinally extending lands or teeth 27 as shown in Figure 4. As further shown in Figure 4, the rolls are constructed in the form of tubes or sleeves which fit over and are secured to hollow cylinders formed of thin-walled metal tubing 28 which serve to support the rubber rolls and cause them to maintain their cylindrical configuration. Each roll 25 and 26 is eccentrically mounted on a drive shaft 29 and 30, respectively, by means of a plurality of cam-like discs 31 which are bored slightly off-center to receive the shafts 29 and 30. The discs are arranged in spaced relation along the shafts and are secured both to the shafts and also to the tubes 28 so as to provide an eccentric mounting for the rolls on their respective drive shafts.

The shafts 29 and 30 are journaled at their upper ends in bearings 32 and 33 (Figure 2), respectively, which bearings are secured to the side rails 12 near the upper ends thereof. In a like manner, the lower ends of the drive shafts 29 and 30 are journaled in bearings 34 and 35, respectively, which are mounted on, and secured to, the end rail 13 (see also Figure 3). As shown in Figures 2 and 3, the bearings 33 and 35 are slightly elevated above the bearings 32 and 34 so as to cause the roll 26 to lie slightly above the roll 25 for a purpose hereinafter to be described.

As shown in Figure 2, the drive shafts 29 and 30 each have secured thereto a helical gear 40 and 41, respectively, which gears are of the same diameter and are arranged to mesh with one another and thereby cause the rolls to always rotate in unison but in opposite directions. As further shown herein, the gear 40 meshes with a third helical gear 42 which is secured to a jackshaft 43 journaled between the side rails 12 of the machine frame. Also secured to the shaft 43 is a sprocket 44 which is drivingly connected with a second sprocket 45 by means of a chain 46. The sprocket 45 is secured to a shaft 47 which is journaled in a pair of bearing brackets 48 (only one shown) which are supported upon a pair of inverted U-shaped brackets 49 (only one shown) which are in turn attached to, and supported on, the stretcher bars 15 of the frame. Also secured to the shaft 47 is a large pulley 50 which is connected by a V-belt with a smaller pulley 52 mounted on the shaft of an electric motor 53 which is supported on the stretcher bars 15. Hence, when the motor is energized, the shaft 47 will be rotated so as to cause the jackshaft 43 to be driven and the rolls 25 and 26 to be rotated at a speed of from 300 to 500 revolutions per minute. The direction of drive is such that the upper surfaces of the rolls 25 and 26 will move toward one another and the teeth 27 on the rolls will cause the ears of corn supported thereon to be agitated and thereby caused to feed slowly along the inclined trough formed by the rolls due to the action of gravity.

As mentioned earlier herein the rolls are eccentrically mounted upon their drive shafts, the direction of eccentricity or offset of the rolls being the same in both cases as may be clearly seen in Figure 4. As shown in this figure, the center of the roll 25 lies slightly to the left of the center of the shaft 29 and, likewise, the center of the roll 26 lies slightly to the left of the shaft 30. As a result, when the rolls are revolved by means of the driving mechanism described above, the center of the trough formed by the pair of rolls will shift from side to side as the rolls rotate thereby causing further agitation of the ears of corn lying in the trough whereby a slow but steady feed of the ears of corn through the machine under the influence of gravity is assured.

In order to scrub the ears of corn as they pass down the trough formed by the rolls 25 and 26 and also to cause the rotation of the ears as they move along the trough, I have provided a brush device or mechanism lying above the rolls which is operated by the same electric motor 53 that drives the rolls 25 and 26. As shown in Figures 1 and 2, this mechanism consists of a series of circular bristle brushes 59 which are mounted on a shaft 60 and separated from one another by spacer sleeves 61. The assembly of brushes 59 and sleeves 61 is held together by means of nuts 62 which are threaded on to either end of the shaft 60 and which, when tightened, will serve to clamp the assembly together so as to form an integral brush unit.

The shaft 60 is journaled at either end in bearings 63 which are hung from a rectangular angle iron frame 64. This frame is journaled at either end for rotation about the axis of a drive shaft 65 (Figure 3). The shaft 65 is journaled at one end in a tubular housing (not shown) supported at its lower end on a post 66 (Figure 3) mounted near the lower end of one of the side rails 12. The opposite end of the shaft 65 is journaled in a bearing 67 supported on the upper end of a post 68 (Figure 2) which is attached to the upper surface of the rear side rail 12. Hence, as shown in Figure 3, the entire brush assembly may be swung upwardly about the axis of the shaft 65 and away from over the rolls 25 and 26 so as to expose and provide access to the feed-trough portion of the mechanism.

As also shown in Figure 3, the brush shaft 60 has secured thereto a pulley 70 which is drivingly connected by a V-belt 71 with a second pulley 72 secured to the lower end of the shaft 65. As shown in Figure 2, the shaft 65 is provided near its upper end with a bevel gear 73 which meshes with a second bevel gear 74 mounted on the forward end of a short shaft 75 (Figure 1) which is journaled in a bearing 76 supported from the bearing 67 by means of an elbow plate 77. Secured to the rear end of the shaft 75 is a pulley 78 which is connected by a V-belt 79 with a large pulley 80 (Figure 2) mounted on the shaft 47. Therefore, when the shaft 47 is driven by the electric motor 53, the short shaft 75 (Figure 1) will be rotated thereby causing rotation of the shaft 65 through the gear connection 73 and 74. The brush shaft will thereby be driven through the V-belt 71 so as to cause the brushes 59 to be rotated at a speed of from 1000 to 1500 R. P. M. It will thus be observed that inasmuch as the frame 64 on which the brush mechanism is supported is mounted for pivotal movement about the axis of the shaft 65, it will therefore be possible to swing the frame and the brushes about this pivot without interfering in any way with the power drive of the brushes by the V-belt 71. Hence, in the event that a jam should occur as a result of the improper feeding of the ears of corn along the rolls 25 and 26, the brush mechanism may be swung upwardly so as to expose the rolls and the corn supported thereon and enable the operator of the machine to remedy the trouble without shutting down the machine.

Means is also provided for enabling the height of the brushes above the rolls to be adjusted as may be desired in order to enable the machine to accommodate different sizes of corn. For this purpose, an arm 82 (Figure 3) is attached to the rectangular frame 64 and depends therefrom so as to lie in front of the forward end of an adjusting screw 83 which is threaded at its forward end so as to screw through a nut (not shown) which is welded or otherwise secured to the post 66. The screw 83 is provided with a hand wheel 84 by means of which the screw may be rotated so as to adjust the position of the frame 64. The forward end of the screw 83 also serves as a stop against which the lower end of the arm 82 abuts when the brush mechanism is returned from its raised or inspection position back to its normal or operating position.

The direction of rotation of the rolls 25 and 26 and of the brushes 59 is shown by arrows in Figure 3. As therein shown, the rolls rotate in such a direction that the upper surfaces thereof move toward one another while the brushes 59 rotate in a counterclockwise direction. Also shown in this figure in dotted outline, is a hypothetical ear of corn 88 which serves to show the spatial relationship between the corn, the rolls and the brushes. Inasmuch as the brushes 59 are bearing down on top of the ear of corn 88, the counterclockwise rotation of the brushes will tend to rotate the corn in a clockwise direction, as shown by the arrow in Figure 3, at a speed of approximately 300–500 revolutions per minute. In order to guard against the possibility of the brushes rolling the ear of corn out of the trough provided by the rolls 25 and 26, a guard rail 90 (see also Figure 1) is mounted on the frame of the machine so as to lie above and parallel to the roll 26. The rail 90 is supported in this position by means of a pair of curved supporting arms 91 which are secured to the rear side rail 12. As further shown in Figure 3, the rail 90 is inclined forwardly at an angle of approximately 45° so as to prevent the corn from attempting to ride up on the rail when it strikes thereagainst with the consequent jamming of the corn in between the brushes 59 and the upper edge of the rail. The rail 90 is also provided along its forward face with a protective layer of rubber, leather or similar yieldable and resilient material so as to prevent mashing of the kernels on the ear in case the corn is brushed out of the trough and against the rail by the brushes 59. As shown in Figure 1, the left-hand or upper end of the rail 90 is curved outwardly so as to cause this end of the rail to merge into the channel provided in the guide chute 20 and to assist the chute in guiding the ears of corn into the center of the trough provided by the rolls 25 and 26.

As a further precautionary measure against the displacement of the corn from the trough provided by the rolls, an adjustable guard rail 92 is located above and to one side of the roll 25 so as to guard against the possibility of any of the ears of corn rebounding out of the trough in a forwardly direction. As shown in Figures 1 and 3, this rail is supported on a pair of curved arms 93 which are provided with angular, forward extensions 94 which are provided with slots 95 for receiving bolts 96 which screw into the top face of the forward side rail 12. Hence, the rail 92 may be adjusted either toward or away from the roll 25 as may be desired.

I have found that the cleaning and silking of the corn is greatly facilitated if the corn is maintained in a wet condition throughout the operation. I have also found that the use of water is helpful in preventing the corn from sticking in the guide chute 20. I have accordingly provided a complete water spraying system for my machine which comprises a spray tube 100 which, as shown in Figure 1, is held fast on the curved arms 93 by means of clamps 101. The tube 100 is thereby maintained substantially parallel to the axis of rotation of the rolls and brushes and is provided with a series of spaced orifices 102 which are so positioned along the tube as to lie opposite each one of the brushes 59. Hence, when water is supplied to the tube, a small stream of water will be caused to impinge against the lower surface of each of the rotating brushes. The tube 100 is also provided with a cap 103 at its lower end and with a combined cap and elbow connection 104 at its upper end. Secured to the elbow is a valve 105 through which water may pass into a curved tube 106 for the purpose of directing a controlled amount of water into the guide chute 20. Water is supplied to the system by means of an inlet pipe 107 (Figures 2 and 3) by means of which water under pressure may be supplied to the tubes 109 and 106.

I have found that the removal of the silk from the ears of corn is greatly facilitated by the wetting of the same. The application of water to the silk apparently has the effect of increasing the weight of the same so that when the corn is rotated as shown in Figure 3 by the brushes 59 at a relatively high speed, the silk will be thrown outwardly away from the ear by centrifugal force. It will thereafter be caught by the brushes and pulled loose from the ear. The use of water also aids in washing away any foreign matter such as dirt, worms, etc., after this matter has been loosened by the scrubbing action of the brushes. In my machine, the thorough scrubbing action produced by the brushes on each ear of corn as it passes along the trough, plus the thorough wetting of the corn by means of the water system which I have provided, combines to effect an efficient and thorough method of cleaning the corn.

In order to prevent the water sprayed on the brushes 59 by the tube 100 from being thrown out of the machine, I have provided a semi-circular splash shield 110 which is mounted above the brushes and secured to the rectangular frame 64. The machine is also provided with a drain trough 111 (Figures 2 and 3) which is of semi-circular shape and is supported beneath the rolls 25 and 26 by the side rails 12. This trough serves to catch water flowing out of the delivery end of the guide chute 20 and also water sprayed on the brushes from the orifices 102. It also serves to catch the silk, foreign matter and other refuse removed from the corn. Any suitable receptacle may be placed at the lower end of the trough 111 to receive the water and other material issuing from the end of the trough.

Referring once again to Figure 3 it will be recalled that the roll 26 is slightly elevated above its companion roll 25. This is done for the purpose of preventing the corn from being forced sidewise out of the trough by the action of the brushes 59. Even a slight elevation of the rearward roll 26 above the forward roll will aid greatly in overcoming the tendency of the corn to roll out of the trough. In this connection, it will be noted that the roll 26 (Figure 3) rotates in a counterclockwise direction with the result that the upper surface of the roll is continually moving toward the front of the machine. This further tends to prevent the corn from being rolled rearwardly out of the trough under the influence of the brushes. In other words, a treadmill effect is produced on the corn by the roll 26 which prevents it from moving rearwardy out of the trough.

Although I have described my invention in connection with one particular form or embodiment thereof, it will, of course, be apparent that my invention is not limited to the particular construction disclosed herein and that various modifications thereof may be resorted to without departing from the spirit of my invention.

Having thus described my invention, what I claim as new and useful and desire to secure by United States Letters Patent, is:

1. A corn cleaning and silking machine comprising a pair of inclined, rotatable, supporting rolls lying parallel to one another so as to form an inclined trough along which the ears of corn may travel under the influence of gravity in their passage through the machine, a brush device located above the trough formed by said rolls for removing the silk and foreign matter from the ears of corn, a frame situated above said rolls, means for supporting said brush device on said frame for rotation about an axis parallel to the axes of rotation of said rolls, means for supporting said frame for pivotal movement about an axis lying parallel to the axes of rotation of said rolls and to one side thereof so as to enable the brush device to be moved away from the rolls, an electric driving motor, driving means operated by said motor for rotating said rolls and said brush device, said means including a mechanism for rotating said brush device in any position of said frame whereby the brush device may be moved away from over the rolls without stopping the motor.

2. A corn cleaning and silking device as recited in claim 1 including means for adjusting the position of said frame when the brush device is located in operating position above said rolls whereby the height of the brush device above the rolls may be varied in accordance with the size of the corn being processed.

3. A corn cleaning and silking machine comprising a pair of inclined, rotatable, supporting rolls disposed parallel to one another so as to provide an inclined trough along which the corn may travel in its movement through the machine, a plurality of longitudinally extending teeth on said rolls for agitating the ears of corn supported thereon, a rotary brush device located above the trough formed by said rolls for removing the silk and foreign matter from the ears of corn, and driving means for rotating said rolls and said brush device so as to cause the ears of corn to be agitated by said rolls and rotated by said brush device whereby the corn will be gravity fed along the trough and scrubbed by the brush device so as to cause cleaned and silk-free ears of corn to issue from the lower end of the rolls.

4. A corn cleaning and silking machine as recited in claim 3 including a water spray device for wetting the ears of corn as they pass beneath the brush device so as to aid in the removal of the silk and foreign matter from the ears.

5. A corn cleaning and silking machine as recited in claim 3 including a guard rail disposed above and parallel to one of said rolls and in close proximity to said one roll and to said brush device for preventing sidewise movement of the corn out of the trough under the influence of said rotating brush device.

6. A corn cleaning and silking machine as recited in claim 3 wherein said rolls are rotated in opposite directions by said driving means.

7. A corn cleaning and silking machine as recited in claim 6 wherein the upper surfaces of said rolls move toward one another.

8. A corn cleaning and silking machine comprising a rotary brush means for cleaning the ears of corn and for removing the silk therefrom, and means for transporting the ears of corn past the brush means, including a pair of inclined shafts disposed parallel to one another, means for synchronizing the rotation of said shafts, and a rubber roll eccentrically mounted on each of said shafts so as to provide an inclined trough along which the ears of corn may travel as they pass through the machine, the direction of eccentricity of said rolls lying in the same direction so as to in effect cause the trough to be reciprocated laterally as the shafts are rotated whereby the ears of corn lying on the rolls will be agitated as the rolls revolve and so caused to feed by gravity down the trough formed by the rolls.

9. The invention as recited in claim 8 wherein said synchronizing means is so arranged as to cause said shafts to be rotated in opposite directions.

10. The invention as recited in claim 9 including driving means for operating said rolls, said driving means being so arranged as to cause the upper surfaces of the rolls to move toward one another.

11. The invention as recited in claim 10 wherein said rolls are provided with a plurality of longitudinally extending protuberances.

12. The invention as recited in claim 11 wherein said brush means is supported for rotation about an axis parallel to the axes of said shafts.

13. The invention as recited in claim 12 including a guard rail disposed above and parallel to one of said rolls and in close proximity to said one roll and said brush means so as to prevent the latter means from forcing the ears of corn sideways out of the trough provided by said rolls.

14. A corn cleaning and silking machine comprising means for supporting the ears of corn and for feeding them through the machine, a brush supporting shaft located above said supporting means, a brush on said shaft for scrubbing the corn and removing the silk therefrom, a frame located said supporting means, means on said frame for supporting said brush shaft for rotation, means for pivotally supporting said frame for rotation about an axis lying parallel to the axis of rotation of said brush shaft and to one side thereof so as to enable the brush to be swung up or down relative to said supporting means, a jackshaft journaled for rotation about an axis coinciding with the axis of rotation of said frame, an electric motor for driving said jackshaft, and a driving connection between said jackshaft and said brush shaft for rotating the brush in any position of said frame whereby the brush may be moved away from over the supporting means without interrupting the drive of the brush from the motor.

15. A corn cleaning and silking machine as recited in claim 14 including means for adjusting the position of said frame when the brush is located in operating position above said supporting means whereby the height of the brush above said supporting means may be varied in accordance with the size of the corn being processed.

16. A corn cleaning machine comprising a pair of identical, rotatable, supporting rolls disposed in parallel relation with respect to one another so as to provide a trough for receiving and supporting the ears of corn to be cleaned, a rotary brush disposed above the center of the trough for removing the silk and foreign matter from the corn, said brush being mounted for rotation about an axis parallel to the axes of rotation of said rolls, and driving means for rotating the brush in one direction, one of the rolls in the same direction, and the other roll in the opposite direction, the rolls moving downwardly at their inner sides and the axis of rotation of said one roll being disposed slightly above the horizontal plane passing through the axis of rotation of said other roll so as to reduce the tendency of the brush to roll the corn over said one roll and out of the trough, and a guard rail lying parallel to and immediately above said one roll with its top edge tilted toward said other roll for positively preventing displacement of the corn from the trough.

ROY R. FEESER.

References Cited in the file of this patent

UNITED STATES PATENTS

| Number | Name | Date |
| --- | --- | --- |
| 589,141 | Rice | Aug. 31, 1897 |
| 983,691 | De Long | Feb. 7, 1911 |
| 1,081,367 | Cook | Dec. 16, 1913 |
| 1,464,775 | Reuter | Aug. 14, 1923 |
| 1,684,896 | Stebler | Sept. 18, 1928 |
| 1,770,916 | Griffin | July 22, 1930 |
| 1,848,309 | Brogden | Mar. 8, 1932 |
| 2,546,264 | Jones | Mar. 27, 1951 |

FOREIGN PATENTS

| Number | Country | Date |
| --- | --- | --- |
| 26,329 | Great Britain | of 1902 |